Patented Feb. 7, 1933

1,896,160

UNITED STATES PATENT OFFICE

WILLIAM S. CALCOTT, OF PENNS GROVE, NEW JERSEY, AND ALBERT S. CARTER, OF WILMINGTON, DELAWARE, ASSIGNORS TO E. I. DU PONT DE NEMOURS & COMPANY, OF WILMINGTON, DELAWARE, A CORPORATION OF DELAWARE

HALOGENATION PROCESS AND PRODUCTS PRODUCED THEREBY

No Drawing. Application filed March 7, 1930. Serial No. 434,158.

This invention relates to new and useful products derived from acetylene polymers and particularly the process of their production. More particularly it relates to products of the reaction of sulfuryl chloride with acetylene polymers.

Prior art

It is known that by passing acetylene into a mixture of ammonium chloride, water, cuprous chloride and copper powder of suitable proportions and under proper conditions, unsaturated hydrocarbons of higher molecular weight are formed. These hydrocarbons may be separated by distillation from the reaction mixture. The product is a low-boiling (80-85° C.) highly unsaturated liquid. This liquid is apparently made up of a number of constituents, apparently having the general formula $C_xH_x$. The major constituent is called divinylacetylene and most probably has the empirical formula $C_6H_6$. Others formed in appreciable proportions, which may be mentioned, are believed to have the formulæ $C_8H_8$ and $C_4H_4$. These products in turn may be roughly separated by distillation.

It is also known that the crude mixture, any one of its constituents or mixtures of the various constituents may be polymerized in various ways, for instance, by aging at ordinary temperatures. The polymerization is greatly accelerated at elevated temperatures, and is known to take place either in the presence of oxygen or inert gases, as nitrogen. In the presence of oxygen, the polymerizing material will absorb oxygen with the development of compounds having explosive properties. Therefore, if it is desired to carry out the polymerization in an oxygen environment and at the same time produce a material free from chemically combined oxygen some method for inhibiting oxidation must be employed. One successful method already disclosed is to incorporate into the material to be polymerized a substance which will prevent oxygen absorption.

As the polymerization proceeds regardless of the method employed, the material passes successively to an oily, then to a gelatinous, then to a resinous mass, and finally yields a hard, brittle resinous material having unusual resistance to the action of water and to organic solvents. The oily product which is first formed is largely soluble in alcohol and acetone; the gelatinous body next formed is largely soluble in acetone but only partially soluble in alcohol; the resinous modification is substantially insoluble in alcohol and is to a slight extent soluble in acetone; the final, hard, brittle polymers are substantially insoluble in both alcohol and acetone. These successive polymerization products apparently consist of a group of compounds in various stages of polymerization and they may be only roughly separated by dissolving. They may be successfully separated by distillation.

If the polymerization is stopped in the initial stages, the oily liquid polymer obtained may be separated from the volatile unpolymerized material by distillation. The resultant residue is a non-volatile substance having the general properties of a bodied drying oil. It has been shown that this drying oil may be used in the manufacture of paints or other coating compositions. It may be mixed with the solvents, pigments, fillers, etc., commonly employed in the preparation of coating compositions.

The example following illustrates the preparation from acetylene of the polymerizable polymer by the known method referred to above.

Example A 945 parts by weight of ammonium chloride, 1000 parts by weight of water, 2850 parts by weight of cuprous chloride, and 100 parts by weight of copper powder, are mixed and this mixture thoroughly agitated while passing into it acetylene gas. When the reaction slows up, as shown by a decrease in the rate of absorption of acetylene, the operation is discontinued, and the highly unsaturated hydrocarbon product formed is obtained by distillation, which is stopped when the condensed hydrocarbon is mixed with much water. The water is separated and returned to the reaction mass which, after cooling, is ready for the absorption of more acetylene. It is preferable, although not essential, to keep the reaction temperature at approximately 25° C. by suitable cooling of the reaction mass. As already stated, the resultant material contains a number of polymers the most abundant of which is believed to be divinylacetylene and to have the formula

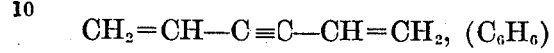

Other polymers produced in appreciable quantities are believed to have the formulæ: $C_8H_8$ and $C_4H_4$. These products may be roughly separated by distillation.

As illustrative of the partial polymerization by a known method of the material obtained in Example A, the following example is furnished.

Example B 1000 grams of pure divinylacetylene obtained from the product of Example A by distillation is boiled at atmospheric pressure and in the presence of air for four hours in a vessel provided with a condenser for the return of the condensed vapors to the reaction. The temperature of the boiling liquid is between 89° and 90° C. At the end of four hours the unchanged divinylacetylene is distilled off under reduced pressure. There remains, in 12 to 18% yield, a viscous nonvolatile residue having the general properties of a bodied drying oil and consisting of the polymerized divinylacetylene.

The above examples, it will be understood, merely illustrate the preparation of the already known materials and are not a part of the present invention. It will be understood that any one of the first-step polymers or a mixture thereof may be polymerized similarly to the divinylacetylene of Example B and that the polymerization, instead of being discontinued at the oily stage as described in Example B, may be continued to any of the successive stages of partial polymerization described above or to obtain a solid polymer as the final product.

Object of invention

Owing to their high degree of unsaturation, the characteristic behavior of the polymerizable acetylene polymers, as prepared by the methods described above, is to rapidly absorb oxygen and also to undergo further polymerization. It is the object of this invention to utilize the high degree of unsaturation to form from such polymers, other than by polymerization alone, more stable compounds, which compounds will have a decreased tendency to oxidize and polymerize and will themselves be valuable or will constitute valuable intermediates for the preparation of numerous, useful and novel compounds.

Description of invention

The objects are accomplished by the introduction of halogen at one or more of the unsaturated links of the acetylene polymer molecule. In copending applications we have disclosed two methods of accomplishing this end; first by direct chlorination, second by reaction with sulfur chloride. We now have found that the introduction of chlorine at one or more of the unsaturated links of the acetylene polymer molecule may be accomplished through the agency of sulfuryl chloride ($SO_2Cl_2$).

We have found that all of the acetylene polymers and polymerized acetylene polymers described in Examples A and B (prior art) will react with sulfuryl chloride under suitable conditions, with the possible exception of the substantially completely polymerized hard brittle solid polymer. The hard brittle substantially completely polymerized polymer appears to be unaffected under our working conditions; the less highly polymerized solid polymers of the semiplastic type, however, react normally.

These polymerizable acetylene polymers either in solution or alone, with or without a catalyst, react with sulfuryl chloride to form a mixture of products, a portion of which are chlorinated derivatives containing no sulfur. The other products are essentially polymers and hydrocarbon esters of sulfur containing acids. The chloro-derivatives of the acetylene polymers, so formed, are less unsaturated and therefore more stable than the original acetylene polymers; they contain chlorine in addition to carbon and hydrogen and their boiling point and viscosity are increased over those of the original compound.

Catalysts are not necessary for this reaction but may be used. They have been found to speed up the reaction, in some cases to such degree as to cause explosive violence. With the use of solvents whereby the velocity of the reaction is decreased, it is however frequently advantageous to use a catalyst such as aluminum chloride, ferric chloride or zinc chloride. Any liquid which does not react with sulfuryl chloride is suitable as a solvent, as for example, carbon tetrachloride, 1,1,2,2-tetrachloroethane, chloroform, benzoyl chloride, acetyl chloride and liquid sulfur dioxide; moreover, any solvent may be used where the reaction between solvent and sulfuryl chloride is slow and has no influence on the course of the desired major reaction, for example, acetic acid.

The invention will be readily understood from consideration of the following examples which it will be understood are furnished merely by way of illustration.

Example I (preferred embodiment)

100 parts by weight of the acetylene polymer of Example A (prior art) thought to be divinylacetylene is added to approximately 170 parts of sulfuryl chloride at room temperature. The reaction is hastened at the start by warming slightly, but as soon as it becomes apparent as evidenced by the evolution of $SO_2$, the mixture is cooled and held at 30–35° C. until the reaction is completed. When no more $SO_2$ is liberated, the product is washed with water giving a crude oil which may be used as such or purified by steam distillation or vacuum distillation, giving a dark tarry residue of polymerized chlorine-containing acetylene polymers and a volatile oil. The oil is a heavy colorless liquid which decomposes and polymerizes at elevated temperature with a probable boiling point of 58° at 7 mm. of mercury pressure. This compound which is thought to be $C_6H_6Cl_2$ (possibly 3,4-dichloro-1,3,5-hexatriene) has a pepper like odor, it is a mild lachrymator and skin irritant; soluble in ether, carbon tetrachloride, benzene, chloroform, acetone, ethyl acetate and most organic solvents and partially soluble in methanol, ethanol and acetic acid. Heating with sodium acetate, sodamide, sodium ethoxide, aqueous caustic, many amines such as dibutylamine, aniline, p-toluidine, etc., causes the removal of chlorine with the formation of new compounds, frequently polymerized to high molecular weight.

Example II 100 parts of crude acetylene polymers described in Example A are added to 700 parts of sulfuryl chloride and the reaction carried out as before controlling the temperature below 40° C. By steam distillation a small quantity of the compound described in Example I may be removed. The residue is a dark tarry mass similar to the residue in Example I but containing more chlorine, it probably being a mixture of chloro-derivatives and a compound thought to be $C_6H_6Cl_4$. This compound is more saturated than that described in Example I and does not absorb oxygen as rapidly.

Example III 100 parts of the non-volatile liquid acetylene polymers described in Example B are treated with 170 parts of sulfuryl chloride as in Example I. After washing with water, this product is a non-volatile oil composed of chloro-derivatives of polymerized acetylene polymers containing approximately 47 to 50% chlorine. In solution in toluene, xylene or solvent naphtha, this compound constitutes a new and useful coating composition.

Example IV

Example III is repeated but with the $SO_2Cl_2$ dissolved in an equal weight of carbon tetrachloride or 1,1,2,2,-tetrachloroethane. The product is the same as that obtained by dissolving the reaction product from Example III in an equal weight of solvent. The reaction, however, in this case is much less vigorous.

Example V 300 parts of sulfuryl chloride are heated to boiling under an efficient reflux condenser; 150 parts of crude acetylene polymers (described in Example A) are slowly added over a period of about one hour. Refluxing is continued for several hours, the product is then washed and found to be similar in properties but not necessarily identical with that obtained in Example III.

Example VI

One part of aluminum chloride is added to 135 parts of sulfuryl chloride dissolved in 200 parts of carbon tetrachloride and the mixture chilled to below 0° C. To this is very slowly added 78 parts of the crude acetylene polymers of Example A while the solution is violently agitated. The solution becomes dark while a vigorous reaction takes place; when complete, the mixture is found to contain a small quantity of volatile chloro-compounds, the major portion of the product being a tarry semi-liquid polymer containing a variable quantity of chlorine.

Example VII 100 parts of the acetylene polymer thought to be monovinylacetylene ($C_4H_4$) of Example A are introduced into 270 parts of $SO_2Cl_2$ as a gas. The material which escapes from the mixture is passed through a condenser cooled below 0° C. to return acetylene polymer but allow sulfur dioxide to escape. The reaction is held at 20–40° C. until sulfur dioxide is no longer evolved; the product is then washed with water to remove excess $SO_2Cl_2$, separated, dried and distilled. The product so obtained consists of a volatile oil and a less volatile residue; these may be used without separation or may be separated and purified by this or any other known means. The volatile oil distills at atmospheric pressure at a temperature over 100° C. with decomposition and polymerization; it appears to have the molecular formula $C_4H_4Cl_2$, containing approximately 58% of chlorine. It is a heavy, colorless, oil, insoluble in water and soluble in carbon tetrachloride, benzene, chloroform and alcohol; it is thought to be 1,2-dichlorobutadiene-1,3 and/or 1,2-dichlorobutine-3. The less volatile material is composed of polymers of the original acetylene polymer, polymers of the volatile chloride and some small amount of more highly chlorinated material, possibly $C_4H_4Cl_4$.

It will be evident from the above examples that many methods of manipulation may be successfully used to carry out the reactions illustrated above: liquid sulfuryl chloride and liquid acetylene polymer may be brought into reaction; both substances may be as gases and allowed to react in that state; gaseous sulfuryl chloride may be brought into contact with liquid polymers of acetylene; gaseous polymers of acetylene and liquid sulfuryl chloride may be used; a solution of the acetylene polymer may be treated with liquid or gaseous sulfuryl chloride or with sulfuryl chloride in a solvent; or finally sulfuryl chloride may be in solution and treated with liquid or gaseous acetylene polymers or with acetylene polymers dissolved in a solvent. In all cases, the crude product is a mixture which we believe to be a chlorine addition product of the acetylene polymer, some polymerized acetylene polymer and its chloro-derivatives and some sulfur containing esters. For some purposes this mixture need not be separated; for example, where chlorine is to be replaced at a later stage and purity of the crude product is of no consequence owing to necessary purification steps on the subsequent products. Also, in cases where the ultimate product is a polymerized derivative, the crude product will generally suffice. A pure chloro-derivative, however, may be obtained when desired by hydrolyzing any excess sulfuryl chloride and purifying by distillation or other known means of fractionation. This compound is not identical to the chloride obtained from the correspondingly polymerized polymer by direct chlorination, as described in the copending application referred to above.

For reaction in the liquid phase, we prefer to operate between 0° and 35° C.; reaction in the vapor phase is most conveniently accomplished between 85 and 150° C.; our working limits are broadly, therefore, 0° to 150° C. Lower temperatures while they may be employed are not practical due to the slowness of the reaction. Higher temperatures, also, may be employed but at such temperatures there is danger of the reaction proceeding at such a rapid rate that it becomes uncontrollable.

When chlorination is effected at temperatures below 20° C. the reaction is apparently primarily an addition resulting in derivatives which are still unsaturated. In such cases the chlorine apparently enters the molecule only at the unsaturated bonds as witnessed by the fact that there is no evidence of hydrochloride in the reaction mixture.

However, as the temperature rises above 20° C. there is an increasing tendency for polymerization to take place simultaneously with the chlorination. When chlorination is effected at temperatures above 35° C., as a result of such polymerization, the viscosity of the final product is appreciably greater than when chlorination is effected below 20° C. Also, within the higher temperature ranges substitution or replacement of hydrogen atoms by chlorine atoms in the molecule of the acetylene polymer appears to take place to a slight extent as witnessed by the presence of HCl.

The reaction with chlorine causes the evolution of heat and therefore, if it is desired to avoid polymerization and substitution, temperature control is necessary. To this end a cooling system is useful. We have further found that it is advantageous to cool the reaction mixture to prevent polymerization and reactions of uncontrollable violence. Alternatively the addition of the sulfuryl chloride may be carried out at so slow a rate that the heat will be radiated as rapidly as evolved. It has been found, also, that the use of an inert solvent decreases the difficulties of cooling and prevents violent and uncontrollable reactions. If a solvent is used, cooling is of less importance but in this case the system should be equipped to condense and return any volatilized material.

In many instances, however, it may be desirable to simultaneously polymerize and chlorinate. In such instances, of course, it will be necessary only to avoid such an increase in temperature as to avoid uncontrollable reactions. The products resulting are substantially the same as regards their physical properties as those obtained by chlorination at low temperatures of the correspondingly polymerized acetylene polymers. The fact that some substitution of hydrogen has taken place will not materially affect the properties of the product.

It will be evident therefore that the temperatures must be regulated in accordance with the viscosity and degree of saturation of the initial product as compared to the product desired. The addition of the chlorine, as already noted, imparts stability to the polymer and resistance to further polymerization and to oxidation. The resulting compounds, which are still unsaturated, will still polymerize and absorb oxygen, but at a relatively lower rate than the original polymer. The chlorination, also, of course, raises the specific gravity and boiling point of the material treated. The viscosity of the treated material also is increased.

From the foregoing examples, it is clear that any proportion of acetylene polymer and sulfuryl chloride may be used. We have found, however, that if more than 5 parts of sulfuryl chloride are used to 1 of acetylene polymer, considerable unreacted $SO_2Cl_2$ is left at the time of the water wash. To obtain the best yields of volatile chloro-derivatives (such as $C_6H_6Cl_2$) we prefer to use an $SO_2Cl_2$/acetylene polymer ratio in the neighborhood of 2/1. A higher ratio results in the formation of products containing over 48% chlorine which are less unsaturated than the material described in Example I and show less tendency to absorb oxygen and dry in the manner of a drying oil.

The materials produced by this invention may be used as drying oils for paints, as adhesives, as plastic or semiplastic hot and cold moulding materials, as dyestuffs intermediates and by reason of their unusual stability are especially adapted for use as linings and coatings for vessels exposed to active chemical reagents. The chemical and physical properties of these new compounds prepared by the manner of our invention, moreover, make them valuable intermediates in the syntheses of various useful derivatives. The degree of polymerization and chlorination will, of course, be determined by the contemplated use.

It will be understood that the products are of complex chemical constitution and that it is impossible to state with any degrees of finality what is their exact chemical constitution.

As many apparent and widely different embodiments of this invention may be made without departing from the spirit and scope thereof, it is to be understood that we do not limit ourselves to the specific embodiments thereof except as defined in the appended claims.

We claim:

1. The process which comprises reacting a polymerizable nonbenzenoid polymer of acetylene with sulfuryl chloride.

2. The process which comprises reacting a polymerizable nonbenzenoid polymer of acetylene with sulfuryl chloride at a temperature below 150° C.

3. A process which comprises reacting a liquid acetylene nonbenzenoid polymer at a temperature between 0 and 35° C. with sulfuryl chloride.

4. A process which comprises reacting a polymerizable nonbenzenoid polymer of acetylene with not over five times its weight of sulfuryl chloride.

5. The process which comprises reacting a normally liquid nonbenzenoid polymer of acetylene with approximately twice its weight of sulfuryl chloride at a temperature below 150° C.

6. The process which comprises reacting a normally liquid nonbenzenoid polymer of acetylene with approximately twice its weight of sulfuryl chloride at a temperature between 0 and 35° C.

7. The process which comprises reacting a polymerizable nonbenzenoid polymer of acetylene with sulfuryl chloride in the presence of a solvent for at east one of the reactants.

8. The process which comprises reacting a normally liquid nonbenzenoid polymer of acetylene with approximately twice its weight of sulfuryl chloride at a temperature between 0 and 35° C. in the presence of a solvent for at least one of the reactants.

9. The process which comprises reacting a polymerizable nonbenzenoid polymer of acetylene with sulfuryl chloride in the presence of a polymerization catalyst.

10. The process which comprises reacting a normally liquid nonbenzenoid polymer of acetylene with approximately twice its weight of sulfuryl chloride at a temperature below 150° C. in the presence of a polymerization catalyst which accelerates the reaction.

11. The process which comprises reacting a normally liquid nonbenzenoid polymer of acetylene with approximately twice its weight of sulfuryl chloride at a temperature between 0 and 35° C. in the presence of a solvent for at least one of the reactants and a polymerization catalyst which accelerates the reaction.

12. The process which comprises reacting divinylacetylene with sulfuryl chloride.

13. The process which comprises reacting divinylacetylene at a temperature between 0 and 35° C. with approximately twice its weight of sulfuryl chloride.

14. The process which comprises reacting 100 parts of divinylacetylene at a temperature between 30 and 35° C. with substantially 171 parts of sulfuryl chloride.

15. The process which comprises reacting divinylacetylene at a temperature between 0 and 35° C. with approximately twice its weight of sulfuryl chloride in the presence of an inert solvent for at least one of the reactants.

16. The process which comprises reacting divinylacetylene at a temperature between 0 and 35° C. with approximately twice its weight of sulfuryl chloride in the presence of an inert solvent for at least one of the reactants and a polymerization catalyst which accelerates the reaction.

17. A chlorinated polymerizable acetylene nonbenzenoid polymer resulting from reacting said polymer with less than five times its weight of sulfuryl chloride.

18. A chlorinated polymerizable acetylene nonbenzenoid polymer resulting from reacting said polymer with less than five times its weight of sulfuryl chloride at a temperature not over 150° C.

19. A chlorinated polymerizable acetylene nonbenzenoid polymer resulting from reacting said polymer with approximately twice its weight of sulfuryl chloride at a temperature not over 35° C.

20. A chlorinated divinylacetylene resulting from reacting divinylacetylene with 1.7 times its weight of sulfuryl chloride at a temperature between 30 and 35° C., said composition containing a heavy, colorless oil which polymerizes at elevated temperature, boils at about 58° C. at 7 mm. pressure, has a pepper-like odor, is a mild lachrymator, and is partially soluble in ethanol, methanol and acetic acid, and soluble in ether and carbon tetrachloride.

21. A process which comprises reacting an incompletely polymerized nonbenzenoid polymer of acetylene with sulfuryl chloride.

22. A process which comprises reacting an incompletely polymerized nonbenzenoid polymer of acetylene with sulfuryl chloride in the presence of an inert solvent for at least one of the reactants.

23. A process which comprises reacting an incompletely polymerized nonbenzenoid polymer of acetylene with sulfuryl chloride in the presence of an inert solvent for at least one of the reactants and in the presence of a polymerization catalyst which accelerates the reaction.

24. A chlorine containing compound resulting from the reaction of an incompletely polymerized nonbenzenoid polymer of acetylene with sulfuryl chloride.

25. In a solvent, the product resulting from the interaction of a non-volatile liquid nonbenzenoid acetylene polymer and sulfuryl chloride.

In testimony whereof we affix our signatures.

WILLIAM S. CALCOTT.
ALBERT S. CARTER.